April 16, 1968     M. L. MATTHEY     3,377,680
AUTOMATIC LATHE

Filed July 7, 1966     5 Sheets-Sheet 1

INVENTOR.
MAURICE L. MATTHEY
BY Kenwood Ross
ATTORNEY.

April 16, 1968  M. L. MATTHEY  3,377,680
AUTOMATIC LATHE

Filed July 7, 1966  5 Sheets-Sheet 4

INVENTOR.
MAURICE L. MATTHEY
BY Kenwood Ross
ATTORNEY.

April 16, 1968   M. L. MATTHEY   3,377,680
AUTOMATIC LATHE

Filed July 7, 1966   5 Sheets-Sheet 5

INVENTOR.
MAURICE L. MATTHEY
BY Kenwood Ross
ATTORNEY.

3,377,680
AUTOMATIC LATHE
Maurice L. Matthey, Geneva, Switzerland, assignor to Tarex S.A., Geneva, Switzerland, a firm of Switzerland
Filed July 7, 1966, Ser. No. 563,565
Claims priority, application Switzerland, July 15, 1965, 9,931/65
3 Claims. (Cl. 29—65)

ABSTRACT OF THE DISCLOSURE

The combination of an automatic lathe of a revolving turret head, a carriage supporting the head, an indexable stop device determining the strokes and changes of speeds of the carriage, a control shaft on the carriage for actuating the indexing of the head and the indexing of the stop device, the control shaft making one complete revolution for each indexing, electric contacts actuated by the stop device during movements of the carriage, a plate for mounting the electric contacts and being itself mounted on the frame so as to be movable in a direction running parallel to the movements of the carriage, the longitudinal position of the working field of the machine being adjustable without adjustment of the various functions of the carriage being affected.

---

Figure 1:
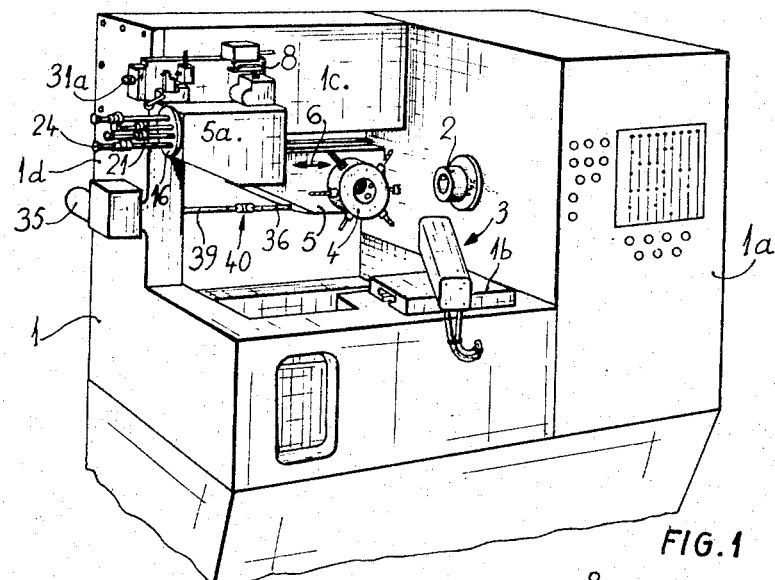

The object of the invention is an automatic lathe with a revolving turret head.

The lathe according to the invention is characterized by the fact that the said head is supported by a carriage provided with a control shaft which not only actuates the indexing of the head but also the indexing of a device comprising stops which determine the strokes and speeds of the carriage, said control shaft executing one complete revolution for each indexing.

Figure 2:
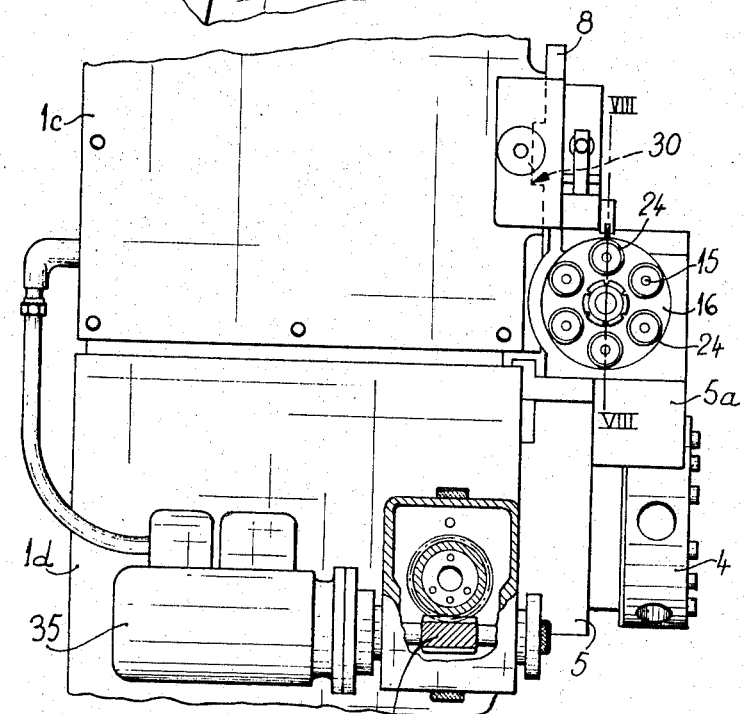
Figure 3:
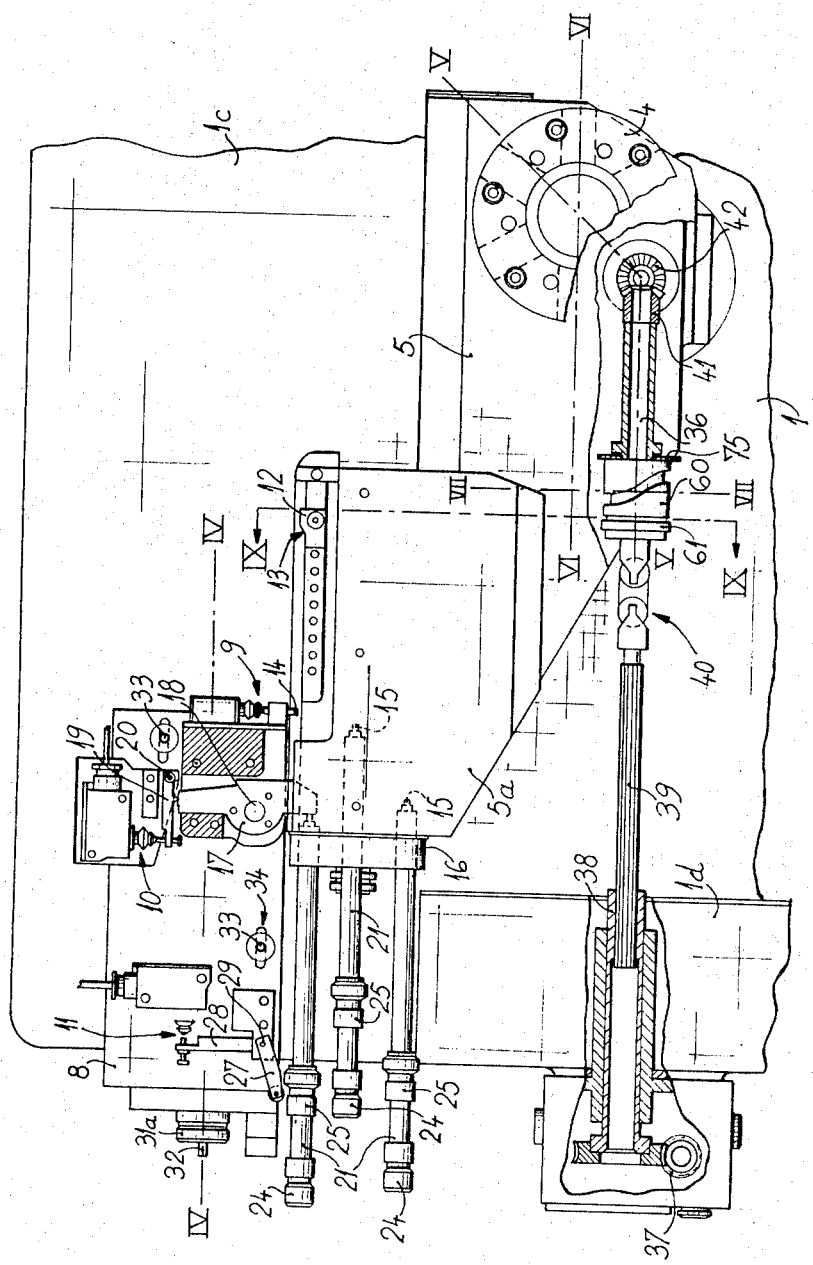
Figure 4:
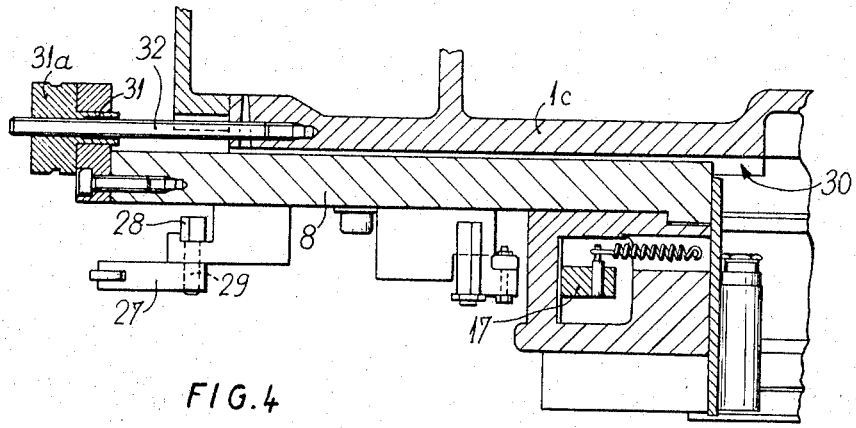
Figure 5:
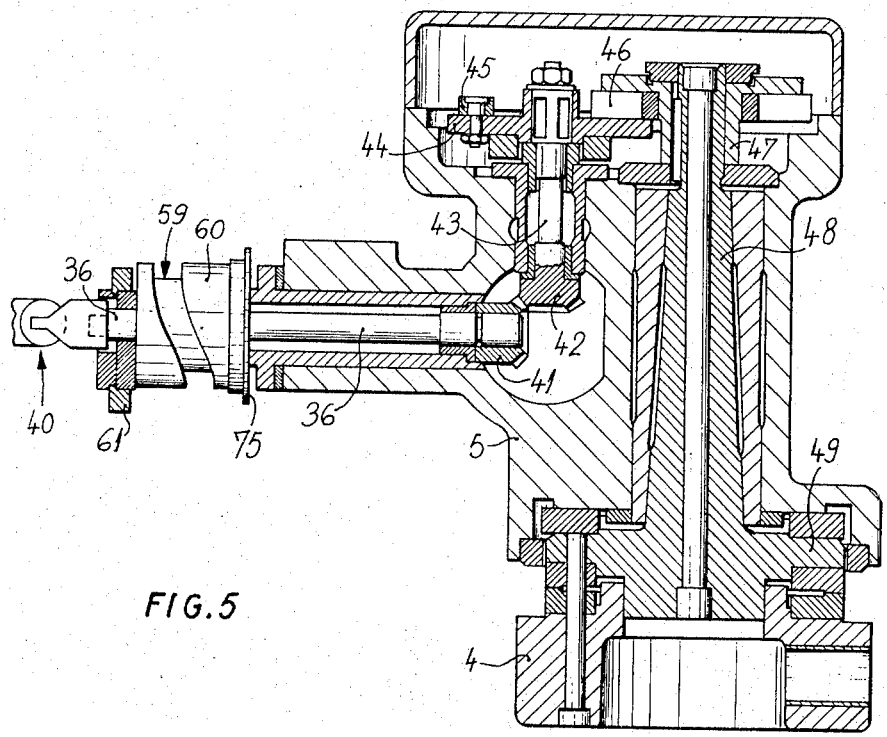
Figure 6:
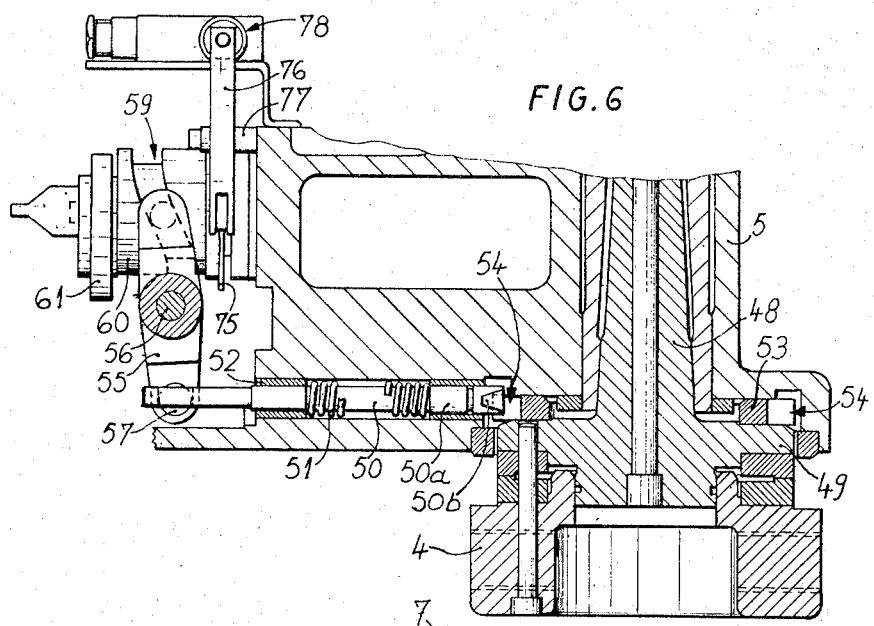
Figure 7:
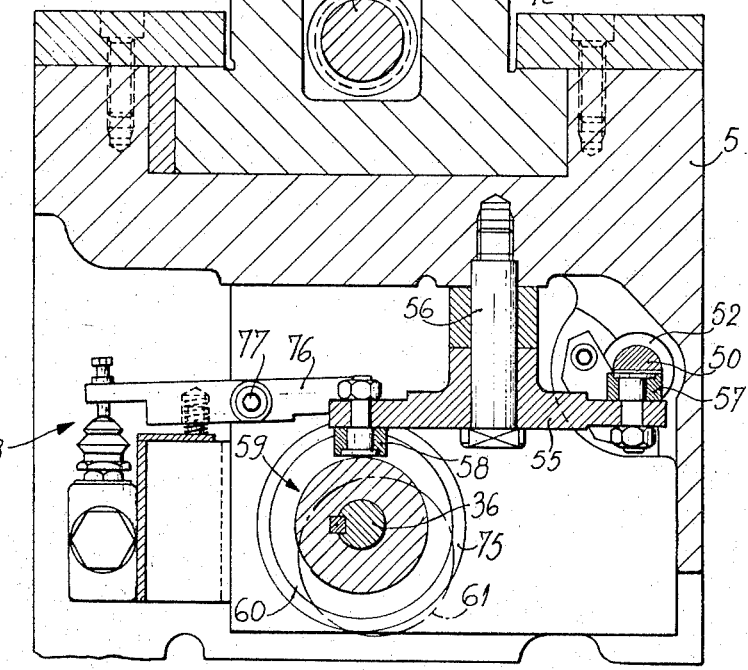
Figure 8:
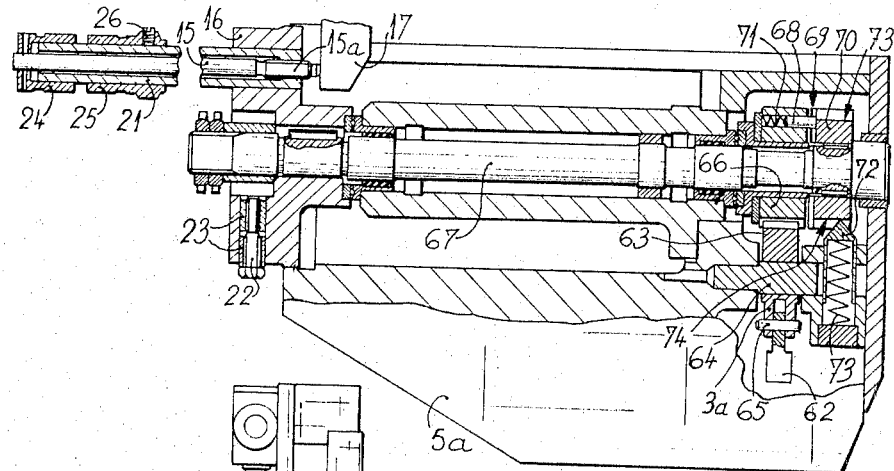
Figure 9:
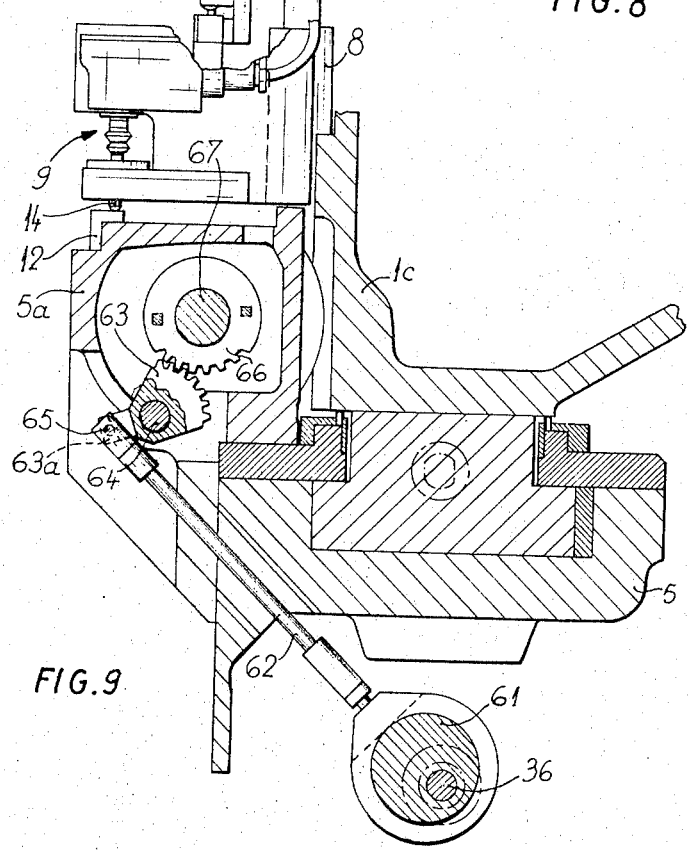

The accompanying drawings show, by way of example, one embodiment of the invention. In the drawings:

FIGURE 1 is a view in perspective of the machine as a whole, shown diagrammatically, FIGURE 2 is a side view in profile of one portion of the machine, shown on a larger scale, partly in section, FIGURE 3 is an elevational view of a portion of the machine, on the same scale as FIGURE 2, partly in section, FIGURE 4 is a section through a detail of the machine on the line IV—IV of FIGURE 3, but shown on a larger scale, FIGURE 5 is a section on the line V—V of FIGURE 3, shown on a larger scale, FIGURE 6 is a section on the line VI—VI of FIGURE 3, also shown on a larger scale, FIGURE 7 is a section through a detail on the line VII—VII of FIGURE 3, shown on a larger scale, FIGURE 8 is a section through a detail on the line VIII—VIII of FIGURE 2, shown on a larger scale, and FIGURE 9 is a section on the line IX—IX of FIGURE 3, shown on a larger scale.

The automatic lathe illustrated comprises a frame 1 of which the portion 1a located to the right in FIGURE 1, that is to the right when standing in the position occupied by the machine operator, houses the spindle of which only the nose denoted by 2 is visible in the drawing. The frame 1 provides a bed 1b supporting a front carriage provided with a copying device denoted generally by the reference numeral 3. A revolving turret head 4 is supported by a carriage 5 suspended from a cross-beam 1c of the machine frame. The carriage moves along the beam in the direction of the double-headed arrow 6 (FIGURE 1). The movements of the carriage are controlled by a device which includes a non-rotatable lead screw 7, fixed to the carriage and visible in FIGURE 7 only, which passes through a screw box (not shown) rotatably mounted in the portion 1a of the machine frame and rotated by the spindle.

The machine comprises a set of electrical contacts mounted on a plate 8 carried by the cross-beam 1c and controlled by stops supported by the carriage 5 for the revolving turret head, so as to determine the rapid approach speeds and the working speeds, as well as the stopping of said carriage. Reference is here made more especially to contacts denoted by 9, 10 and 11 (FIGURE 3) which control respectively the stopping of the carriage at the end of its return stroke, the stopping of the carriage at the end of its feed stroke and the changeover of the carriage from its rapid advance to its working advance rate.

The stopping of the carriage 5 on completion of the return strokes is effected by a block 12 mounted so as to be adjustable on the rear portion, denoted by 5a, of the carriage; this block has an incline 13 thereon which controls the switch 9 by means of a pushrod 14.

The stopping of the carriage 5 at the end of a feed stroke is effected by one or other of the stops constituted by the ends of the rods 15 (FIGURES 3 and 8) carried by a drum 16 which is rotatably mounted on the portion 5a of the carriage. These stops 15 act on the switch 10 by means of a rocking lever 17 having two arms and pivoted at 18, and of a lever 19 pivoted at 20; the lever 17 also operates as a mechanical stop to stop the carriage.

The drum 16 carries six rods 15 which come in succession into a working position by virtue of an indexing device the method of operation of which will be described below. Each rod 15 is screwed at its threaded end 15a into a tube 21 (FIGURE 8) mounted so as to be adjustable on the drum 16. Adjustment of the position of each rod 15 is effected by moving the corresponding tube 21 along the drum 16 and then clamping it with the assistance of a screw 22 which acts on two cotters or bushes 23 which tighten into position. Fine adjustment is effected by screwing in the rod 15 to a greater or lesser extent with the assistance of an adjusting cap 24 carrying a micrometric scale.

Changeover from the rapid approach speed of the carriage 5 to its working speed is controlled by one or other of the stops constituted by sleeves 25 (FIGURES 3 and 8) mounted to slide along the tubes 21 and capable of being clamped on to the latter by means of setscrews 26. The said sleeves actuate the switch 11 through the intermediary of two levers 27 and 28 which are solid with one and the same pivot axis 29. Each tube 21 carries a scale which makes it possible not only to determine the longitudinal position of the tube on the drum 16 but also the position of the sleeve 25 on the tube.

The plate 8 carrying the switches 9, 10 and 11 is mounted on the front face of the cross-beam 1c in such manner as to be capable of movement along a slide 30 in a direction running parallel to the direction in which the carriage 5 moves (FIGURE 4). This adjustment of the position of the plate 8 allows the working field of the machine to be shifted longitudinally without the adjustment of the machine being altered. Thus, for instance, identical machining operations may be carried out on the ends of pieces of work of differing lengths held in a chuck or on a mandrel in the spindle 2, no adjustment means being altered except the position of the plate 8. Adjustments of the plate are controlled by a tapped sleeve 31 rotatably mounted on the plate and solid with an adjusting cap 31a screwed onto a threaded rod 32 fixed to the cross-beam 1c. Clamping screws 33 (FIGURE 3 which pass through elongated openings 34 in the plate 8 render it possible to clamp the latter in position, once adjustment has been carried out.

Indexing of the turret head 4, and also of the drum 16 carrying the stops 15, is effected by a common motor 35 mounted on an upright 1d of the frame 1 (FIGURES 1 and 2). The said motor 35 drives a control shaft 36 for the carriage 5 through the intermediary of a worm 37, grooved sleeve 38, splined shaft 39 which slides within the sleeve 38 during the movements of the carriage 5, and a universal joint 40. The control shaft 36, which is rotatably mounted on the carriage 5, carries at its front end (FIGURE 5) a bevel gear 41 meshing with a bevel gear 42. The shaft 43 on which the latter is mounted carries a disc 44 which has a control finger 45 actuating a Maltese cross 46 solid with the turret head 4. For this purpose the Maltese cross 46 is fixed to a sleeve 47 which is itself keyed to the quill, denoted by 48, of a turret head support 49 to which the head 4 is firmly fastened. With each revolution of the control shaft 36 the turret head 4, under the action of the above-described mechanism, turns through one sixth of a revolution, the head having six tools in the example shown. It should be noted that the Maltese cross ensures progressive accelerations and decelerations of the head.

The turret head 4 is locked, between each indexing movement, by the locking finger 50 (FIGURE 6) arranged radially in relation to the axis of the head and subjected to the action of a return spring 51. The aforsaid spring abuts at one end against a fixed bushing 52 and at the other against a shoulder 50a of the locking finger 50 in order to keep the tip of the latter, denoted by 50b and chamfered away, engaged against a disc 53 which is solid with the head support 49 and rotates with the latter. This disc 53 has six radial notches 54 thereon into each of which the tip 50b of the locking finger 50 engages, so clamping the head in the working position. When indexing of the head is to be carried out, the locking finger 50 is withdrawn by a lever 55 having two arms and pivoted on a pin 56 attached to the carriage 5. The lever 55 carries at one end a roller 57 engaged in a notch on the locking finger 50, and at the other has a roller 58 (FIGURE 7) engaged in the groove 59 of a cam 60 carried by the control shaft 36. Thus, at every revolution of the shaft 36, and in synchronism with the indexing of the head 4, the locking finger 50 is withdrawn from the disc 53 and removed from the notches 54, so as to allow the head to turn.

The indexing of the drum 16 carrying the stops, which is similarly effected in synchronism with the indexing of the head, is effected by an eccentric 61 (FIGURES 5 and 9) carried by the control shaft 36 and controlling, by means of a pushrod 62, a toothed sector 63 which swings about a fixed axis 64. The sector has a lug 63a thereon on which is pivoted at 65 the pushrod 62. The teeth of the sector 63 mesh with the teeth of a serrated sector 66 (FIGURES 8 and 9) mounted loosely on the shaft 67 of the drum 16. The toothed sector 66 carries a finger 68 which is movable axially and meshes with a set of teeth 69 mounted on the face of a disc 70 fixed to the shaft 67. The finger 68 is held by a spring 71 against the set of teeth 69 in such a manner that, in one direction of movement of the serrated sector 66, the shaft 67 and consequently the drum 16 are driven, whereas, in the opposite direction, the finger 68 rides over the set of teeth 69 without driving the disc 70. A jumper 72, subject to the action of a loading spring 73, engages in the radial notches 74 formed on the disc 70 so as to insure stability in the various positions of the drum 16.

Finally the shaft 36 carries a cam 75 (FIGURES 5, 6 and 7) controlling by means of a lever 76 pivotally mounted at 77 on the carriage frame (FIGURES 6 and 7), a switch 78 intended to cut power to the motor 35 at each revolution of the control shaft 36; it should be noted that the motor 35 is subject to the action of a brake which stops it as soon as it receives no current. A restarting pulse is fed to the motor 35 by the switch 9 when the latter is closed by the block 12 at the end of the return stroke of the revolving head; the motor 35 then starts up, so that the switch 78 closes and keeps the motor going until the shaft 36 has made a complete revolution.

What I claim is:

1. In an automatic lathe, the combination of a revolving turret head, a carriage supporting the head, an indexable stop device determining the strokes and changes of speeds of the carriage, a control shaft on the carriage which not only actuates the indexing of the head but also the indexing of the stop device, the control shaft making one complete revolution for each indexing, electric contacts actuated by the stop device during movements of the carriage, a plate on which are mounted the electric contacts, the plate being itself mounted on the frame in such manner as to be movable in a direction running parallel to the movements of the carriage, the arrangement being such that the longitudinal position of the working field of the machine can be adjusted without adjustment of the various functions of the carriage being affected.

2. In an automatic lathe, the combination of a revolving turret head, a carriage supporting the head, an indexable stop device determining the strokes and changes of speeds of the carriage, a control shaft on the carriage which not only actuates the indexing of the head but also the indexing of the stop device, the control shaft making one complete revolution for each indexing, an indexable drum rotatably mounted on the carriage and able to take up as many positions as the head, stops of the stop device carried by the drum, a cam carried by the control shaft, a toothed sector coaxial with the drum and to which a swinging movement is effected by the cam, and a free-wheeling coupling mechanism connecting the toothed sector to the drum in such manner that in one rotational direction of the toothed sector, the drum is rotatably driven and during reverse movement of the toothed sector, the drum remains immobile to the end the indexing of the drum is ensured by the cam with each revolution of the control shaft.

3. In an automatic lathe, the combination of a revolving turret head, a carriage supporting the head, an indexable stop device determining the strokes and changes of speeds of the carriage, a control shaft on the carriage which not only actuates the indexing of the head but also the indexing of the stop device, the control shaft making one complete revolution for each indexing, a fixed motor mounted on the lathe frame, and a splined coupling device connecting the motor to the control shaft in such a way that the control shaft can slide longitudinally during movements of the carriage.

References Cited

UNITED STATES PATENTS

| | | | |
|---|---|---|---|
| 2,559,311 | 7/1951 | Meissner | 29—65 |
| 2,594,782 | 4/1952 | Makaut | 29—64 |
| 2,616,158 | 11/1952 | Tomlinson | 29—64 |

RICHARD H. EANES, JR., *Primary Examiner.*